US00RE48384E

(19) United States
(12) Reissued Patent
Potrebic et al.

(10) Patent Number: US RE48,384 E
(45) Date of Reissued Patent: Jan. 5, 2021

(54) CONTENT ACCESS

(71) Applicant: Rovi Technologies Corporation, San Jose, CA (US)

(72) Inventors: Peter J. Potrebic, Calistoga, CA (US); Prashant K. Jha, Mountain View, CA (US); Mark B. Tozer, Lake Mary, FL (US)

(73) Assignee: Rovi Technologies Corporation, San Jose, CA (US)

(21) Appl. No.: 16/282,142

(22) Filed: Feb. 21, 2019

Related U.S. Patent Documents

Reissue of:

(64) Patent No.: 9,578,363
Issued: Feb. 21, 2017
Appl. No.: 14/851,972
Filed: Sep. 11, 2015

U.S. Applications:

(63) Continuation of application No. 13/477,511, filed on May 22, 2012, now Pat. No. 9,160,971, which is a (Continued)

(51) Int. Cl.
*H04H 60/43* (2008.01)
*H04N 21/2668* (2011.01)
(Continued)

(52) U.S. Cl.
CPC ..... *H04N 21/2665* (2013.01); *H04N 7/12* (2013.01); *H04N 7/163* (2013.01);
(Continued)

(58) Field of Classification Search
CPC ..... H04N 21/454; H04N 21/482; H04N 21/2385; H04N 21/2665; H04N 21/2668;
(Continued)

(56) References Cited

U.S. PATENT DOCUMENTS 5,453,796 A * 9/1995 Duffield ..... H04N 5/45 348/565
6,014,184 A 1/2000 Knee et al.
(Continued)

FOREIGN PATENT DOCUMENTS

JP H08-275073 10/1996
WO WO 2005039186 A1 4/2005
WO WO 2006089022 A1 8/2006

OTHER PUBLICATIONS

J. De Wachter et al., "Optimizing Channel Switching for Digital Television Through Low Quality Streams," an excerpt of the Proceedings of the Sixth IASTED International Conference, Communication Systems and Networks, ACTA Press, 2007, 8 pages.
(Continued)

*Primary Examiner* — Joshua D Campbell
(74) *Attorney, Agent, or Firm* — Haley Guiliano LLP

(57) ABSTRACT

Techniques are described to provide content access. In an implementation, a determination is made at a client that a high-definition channel has content that matches content provided by a standard-definition channel. Access is provided to the content via the high-definition channel and access is restricted to the content via the standard-definition channel up the client is capable of outputting the content and high definition.

8 Claims, 9 Drawing Sheets

Related U.S. Application Data continuation of application No. 12/343,235, filed on Dec. 23, 2008, now Pat. No. 8,234,668.

(51) Int. Cl.

| | |
|---|---|
| ***H04N 21/258*** | (2011.01) |
| ***H04N 21/2385*** | (2011.01) |
| ***H04N 7/12*** | (2006.01) |
| ***H04N 21/482*** | (2011.01) |
| ***H04N 21/454*** | (2011.01) |
| ***H04N 21/45*** | (2011.01) |
| ***H04N 21/2665*** | (2011.01) |
| ***H04N 5/445*** | (2011.01) |
| ***H04N 7/16*** | (2011.01) |
| ***H04N 21/47*** | (2011.01) |

(52) U.S. Cl.
CPC ... *H04N 21/2385* (2013.01); *H04N 21/25833* (2013.01); *H04N 21/25858* (2013.01); *H04N 21/2668* (2013.01); *H04N 21/454* (2013.01); *H04N 21/4516* (2013.01); *H04N 21/47* (2013.01); *H04N 21/482* (2013.01)

(58) Field of Classification Search
CPC ..... H04N 21/4516; H04N 21/25833; H04N 21/25858; H04N 5/44543; H04N 7/12; H04N 7/163
USPC ..... 725/39, 44–47, 56
See application file for complete search history.

(56) References Cited

U.S. PATENT DOCUMENTS 6,157,377 A 12/2000 Shah-Nazaroff et al.
6,813,775 B1 11/2004 Finseth et al.
6,837,789 B2 1/2005 Garahi et al.
6,950,624 B2 9/2005 Kim et al.
6,990,679 B2 * 1/2006 Curreri ..... H04N 5/44543 348/E5.105
7,027,716 B1 4/2006 Boyle et al.
7,093,272 B1 8/2006 Shah-Nazaroff et al.
7,409,140 B2 8/2008 Rodriguez et al.
7,577,970 B2 8/2009 Jarman
8,087,058 B2 12/2011 Cohen
8,095,954 B2 * 1/2012 Walter ..... H04N 5/50 725/37
8,108,901 B2 1/2012 Nicas et al.
8,195,025 B2 6/2012 Branam et al.
8,234,668 B2 7/2012 Potrebic et al.
8,375,414 B2 2/2013 Covey
2001/0007147 A1 7/2001 Goldschmidt Iki et al.
2002/0002708 A1 1/2002 Arye
2002/0056087 A1 5/2002 Berezowski et al.
2002/0154888 A1 10/2002 Allen et al.
2002/0197968 A1 12/2002 Yamanishi
2003/0149980 A1 8/2003 Hassell et al.
2004/0034864 A1 2/2004 Barrett et al.
2004/0078807 A1 4/2004 Fries et al.
2004/0100585 A1 5/2004 Ikeguchi
2004/0117823 A1 6/2004 Karaoguz et al.
2005/0010947 A1 * 1/2005 Ellis ..... H04N 5/44543 725/38
2005/0120373 A1 6/2005 Thomas et al.
2005/0204388 A1 9/2005 Knudson et al.
2005/0216950 A1 9/2005 MacInnis
2005/0251827 A1 11/2005 Ellis et al.
2006/0010470 A1 * 1/2006 Kurosaki ..... H04H 20/76 725/46
2006/0031880 A1 2/2006 Stark et al.
2006/0031883 A1 2/2006 Ellis et al.
2006/0048164 A1 3/2006 Fry et al.
2006/0048184 A1 * 3/2006 Poslinski ..... H04N 5/44543 725/45
2006/0061682 A1 * 3/2006 Bradley ..... H04N 5/46 348/441
2006/0074810 A1 4/2006 Verberkt et al.
2006/0075428 A1 4/2006 Farmer et al.
2006/0078297 A1 4/2006 Nishikawa et al.
2006/0080702 A1 4/2006 Diez et al.
2006/0085828 A1 4/2006 Dureau et al.
2006/0117360 A1 6/2006 Cooper et al.
2006/0123451 A1 6/2006 Preisman
2006/0126736 A1 6/2006 Shen
2006/0184992 A1 8/2006 Kortum et al.
2006/0253782 A1 11/2006 Stark et al.
2007/0101370 A1 5/2007 Calderwood
2007/0122108 A1 5/2007 Bontempi
2007/0127887 A1 6/2007 Yap et al.
2007/0206507 A1 * 9/2007 Reichman ..... H04L 41/5009 370/252
2007/0300263 A1 12/2007 Barton et al.
2008/0092184 A1 4/2008 Kim et al.
2008/0141317 A1 6/2008 Radloff et al.
2008/0201748 A1 8/2008 Hasek et al.
2008/0301749 A1 12/2008 Harrar et al.
2009/0028182 A1 1/2009 Brooks et al.
2009/0150933 A1 * 6/2009 Lee ..... H04H 20/82 725/40
2009/0165050 A1 * 6/2009 Lee ..... H04N 21/235 725/39
2010/0095334 A1 4/2010 Shah-Nazaroff et al.
2010/0100899 A1 * 4/2010 Bradbury ..... H04N 7/17318 725/29
2010/0162292 A1 6/2010 Potrebic et al.
2010/0162321 A1 * 6/2010 Bradley ..... H04N 5/44543 725/56
2012/0131633 A1 5/2012 Pangrac et al.
2012/0189269 A1 * 7/2012 Krakirian ..... H04N 5/782 386/230

OTHER PUBLICATIONS

*Rovi Guides, Inc.* v. *Comcast Corp, et al.*, 2:18-cv-00253 (C.D. Cal, filed Jan. 10 2018), Complaint for Patent Infringement (76 pages).
*Rovi Guides, Inc.* v. *Comcast Corp, et al.*, 2:18-cv-00253 (C.D. Cal, filed Jan. 10, 2018), Exhibit H to Complaint for Patent Infringement (25 pages).
*Rovi Guides, Inc.* v. *Comcast Corp, et al.*, 2:18-cv-00253 (C.D. Cal, filed Jan. 10, 2018), First Amended Complaint for Patent Infringement (76 pages).
*Rovi Guides, Inc.* v. *Comcast Corp, et al.*, 2:18-cv-00253 (C.D. Cal, filed Jan. 10, 2018), Joint Stipulation to Stay Proceedings Pursuant to 28 U.S.C. § 1659(A) (7 pages).
*Rovi Guides, Inc.* v. *Comcast Corp, et al.*, 2:18-cv-00253 (C.D. Cal, filed Jan. 10, 2018), Order on Joint Stipulation to Stay Proceedings Pursuant to 28 U.S.C. § 1659(A) (2 pages).
IPR2019-00284 *Comcast Cable Communications, LLC* v. *Rovi Guides, Inc.*, Petition for Inter Partes Review Under 35 U.S.C. §§ 311-319 and 37 C.F.R. § 42.100 et seq. (90 pages).
IPR2019-00284 *Comcast Cable Communications, LLC* v. *Rovi Guides, Inc.*, Exhibit 1010 to Petition for Inter Partes Review Under 35 U.S.C. §§ 311-319 and 37 C.F.R. § 42.100 et seq.—Declaration of Anthony J. Wechselberger in Support of Perition for Inter Partes Review of U.S. Pat. No. 9,578,363 (146 pages).
IPR2019-00284 *Comcast Cable Communications, LLC* v. *Rovi Guides, Inc.*, Exhibit 1021 to Petition for Inter Partes Review Under 35 U.S.C. §§ 311-319 and 37 C.F.R. § 42.100 et seq.—Transcript of Telephonic Conference Regarding Motion to Stay (17 pages).
IPR2019-00284 *Comcast Cable Communications, LLC* v. *Rovi Guides, Inc.*, Patent Owner's Preliminary Response Pursuant to 37 C.F.R. § 42.107 (37 pages).
IPR2019-00284, IPR2019-00285, IPR2019-00286, IPR2019-00287, IPR2019-00288, and IPR2019-00289 *Comcast Cable Communications, LLC* v. *Rovi Guides, Inc.*, Order—Conduct of the Proceeding (6 pages).

(56) References Cited

OTHER PUBLICATIONS

IPR2019-00284, IPR2019-00285, IPR2019-00286, IPR2019-00287, IPR2019-00288, and IPR2019-00289 *Comcast Cable Communications, LLC* v. *Rovi Guides, Inc.*, Petitioner's Notice of Ranking Petitions (7 pages).
IPR2019-00284, IPR2019-00285, IPR2019-00286, IPR2019-00287, IPR2019-00288, and IPR2019-00289 *Comcast Cable Communications, LLC* v. *Rovi Guides, Inc.*, Patent Owner's.Response to Petitioner's Notice Ranking Petitions (8 pages).
IPR2019-00284, IPR2019-00285, IPR2019-00286, IPR2019-00287, IPR2019-00288, and IPR2019-00289 *Comcast Cable Communications, LLC* v. *Rovi Guides, Inc.*, Order—Conduct of the Proceeding (3 pages).
IPR2019-00284 *Comcast Cable Communications, LLC* v. *Rovi Guides, Inc.*, Decision—Institution of Inter Partes Review (29 pages).
IPR2019-00285 *Comcast Cable Communications, LLC* v. *Rovi Guides, Inc.*, Petition for Inter Partes Review Under 35 U.S.C. §§ 311-319 and 37 C.F.R. § 42.100 et seq. (85 pages).
IPR2019-00285 *Comcast Cable Communications, LLC* v. *Rovi Guides, Inc.*, Exhibit 1110 to Petition for Inter Partes Review Under 35 U.S.C. §§ 311-319 and 37 C.F.R. § 42.100 et seq.—Declaration of Anthony J. Wechselberger in Support of Petition for Inter Partes Review of U.S. Pat. No. 9,578,363 (112 pages).
IPR2019-00285 *Comcast Cable Communications, LLC* v. *Rovi Guides, Inc.*, Patent Owner's Preliminary Response Pursuant to 37 C.F.R. § 42.107 (38 pages).
IPR2019-00285, IPR2019-0026, IPR2019-00287, IPR2019-00288, and IPR2019-00289 *Comcast Cable Communications, LLC* v. *Rovi Guides, Inc.*, Decision—Denying Institution of Inter Partes Review (9 pages).
IPR2019-00286 *Comcast Cable Communications, LLC* v. *Rovi Guides, Inc.*, Petition for Inter Partes Review Under 35 U.S.C. §§ 311-319 and 37 C.F.R. § 42.100 et seq. (84 pages).
IPR2019-00286 *Comcast Cable Communications, LLC* v. *Rovi Guides, Inc.*, Exhibit 1210 to Petition for Inter Partes Review Under 35 U.S.C. §§ 311-319 and 37 C.F.R. § 42.100 et seq.—Declaration of Anthony J. Wechselberger in Support of Petition for Inter Partes Review of U.S. Pat. No. 9,578,363 (111 pages).
IPR2019-00286 *Comcast Cable Communications, LLC* v. *Rovi Guides, Inc.*, Patent Owner's Preliminary Response Pursuant to 37 C.F.R. § 42.107 (41 pages).
IPR2019-00287 *Comcast Cable Communications, LLC* v. *Rovi Guides, Inc.*, Petition for Inter Partes Review Under 35 U.S.C. §§ 311-319 and 37 C.F.R. § 42.100 et seq. (82 pages).
IPR2019-00287 *Comcast Cable Communications, LLC* v. *Rovi Guides, Inc.*, Exhibit 1310 to Petition for Inter Partes Review Under 35 U.S.C. §§ 311-319 and 37 C.F.R. § 42.100 et seq.—Declaration of Anthony J. Wechselberger in Support of Petition for Inter Partes Review of U.S. Pat. No. 9,578,363 (106 pages).
IPR2019-00287 *Comcast Cable Communications, LLC* v. *Rovi Guides, Inc.*, Patent Owner's Preliminary Response Pursuant to 37 C.F.R. § 42.107 (34 pages).
IPR2019-00288 *Comcast Cable Communications, LLC* v. *Rovi Guides, Inc.*, Petition for Inter Partes Review Under 35 U.S.C. §§ 311-319 and 37 C.F.R. § 42.100 et seq. (85 pages).
IPR2019-00288 *Comcast Cable Communications, LLC* v. *Rovi Guides, Inc.*, Exhibit 1410 to Petition for Inter Partes Review Under 35 U.S.C. §§ 311-319 and 37 C.F.R. § 42.100 et seq.—Declaration of Anthony J. Wechselberger in Support of Petition for Inter Partes Review of U.S. Pat. No. 9,578,363 (134 pages).
IPR2019-00288 *Comcast Cable Communications, LLC* v. *Rovi Guides, Inc.*, Patent Owner's Preliminary Response Pursuant to 37 C.F.R. § 42.107 (36 pages).
IPR2019-00289 *Comcast Cable Communications, LLC* v. *Rovi Guides, Inc.*, Petition for Inter Partes Review Under 35 U.S.C. §§ 311-319 and 37 C.F.R. § 42.100 et seq. (84 pages).
IPR2019-00289 *Comcast Cable Communications, LLC* v. *Rovi Guides, Inc.*, Exhibit 1510 to Petition for Inter Partes Review Under 35 U.S.C. §§ 311-319 and 37 C.F.R. § 42.100 et seq.—Declaration of Anthony J. Wechselberger in Support of Petition for Inter Partes Review of U.S. Pat. No. 9,578,363 (121 pages).
IPR2019-00289 *Comcast Cable Communications, LLC* v. *Rovi Guides, Inc.*, Patent Owner's Preliminary Response Pursuant to 37 C.F.R. § 42.107 (42 pages).
ITC Investigation No. 337-TA-1103, Verified Complaint Under Section 337 of the Tariff Act of 19830, As Amended (93 pages).
ITC Investigation No. 337-TA-1103, Complainant's Opening Claim Construction Brief (190 pages).
ITC Investigation No. 337-TA-1103, Joint Claim Construction Chart (22 pages).
ITC Investigation No. 337-TA-1103, Expert Claim Construction Report of Michael Shamos (76 pages).
Barbieri, et al., "A Personal TV Receiver with Storage and Retrieval Capabilities", retrieved at <<http://www.hitech-projects.com/hera/people/nesvadba/papers/2001%20UM%20A%20Personal%20TV%20Receiver%20with%20Storage%20and%20Retrieval%20Capabilities.pdf>>, pp. 8.
Barker, Dennis P., "Review: EchoStar Dish Network ViP 622 HDTV DVR", retrieved at <<http://www.videsignline.com/191600975;jsessionid=T4PVEREC3R11MQSNDLQSKHSCJUNN2JVN?printableArticle=true>>, Aug. 2, 2006, pp. 3.
Klinkmann, Henrik "An Architecture for Accessible and Sharable Digital Video in the Home Environment", Seminar on Internetworking, Spring 2007, Available at <http://www.tml.tkk.fi/Publications/C/23/papers/Klinkmann—final.pdf>, (Mar. 4-5, 2007), 7 Pages.
"Final Office Action", U.S. Appl. No. 12/343,235, filed Aug. 15, 2011, 8 pages.
"Non-Final Office Action", U.S. Appl. No. 12/343,235, filed Mar. 24, 2011, 9 pages.
"Notice of Allowance", U.S. Appl. No. 12/343,235, filed Mar. 26, 2012, 8 pages.
IPR2019-00284 *Comcast Cable Communications, LLC.* v. *Rovi Technologies Corporation*, Judgment—Granting Patent Owner's Request for Adverse Judgment dated Jun. 26, 2019 (3 pages).
Trial Certificate of U.S. Pat. No. 9,578,363 dated Nov. 4, 2019.

* cited by examiner

CONTENT ACCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 9,578,363, which issued based upon U.S. patent application Ser. No. 14/851,972, which* claims priority under [35U.S.C.] *35 U.S.C.* Section 120 as a continuation of U.S. patent application Ser. No. 13/477,511, filed May 22, 2012, *now U.S. Pat. No. 9,160,971,* which is a continuation of U.S. patent application Ser. No. 12/343,235, filed Dec. 23, 2008, *now U.S. Pat. No. 8,234,668,* and titled "Content Access". The aforementioned, earlier-filed applications are hereby incorporated by reference herein in their entireties.

BACKGROUND

The amount of content that is available to users and the way in which users may access that content is ever increasing. For example, users may access a variety of content from cable and satellite television to streaming content via the Internet. Consequently, users are now able to access hundreds of channels that may have different types of content, such as television programs that may include video-on-demand, movies, sporting events, and so on.

Because of the sheer amount of content that is available to users and the various ways in which the content may be provided (e.g., standard. definition versus high definition), however, users may find it difficult to locate particular content of interest. This may be further complicated by the various types of clients that may be used to access the content, such as set-top boxes having personal video recorder functionality that may be difficult to initially set-up. Consequently, users may inadvertently forgo consumption of content that may be of interest to the user due to the difficulty in finding and consuming the content, especially during initial setup of the client.

SUMMARY

Techniques are described to provide content access. In an implementation, a determination is made at a client that a high-definition channel has content that matches content provided by a standard-definition channel. Access is provided to the content via the high-definition channel and access is restricted to the content via the standard-definition channel based on whether the client is capable of outputting the content in high definition.

In an implementation, one or more computer readable media include instructions that are executable at a client to output an electronic program guide having a mode such that when the representation of a television program is selected for recording a television series that includes the television program is automatically selected for recording when in the mode.

In an implementation, one or more computer-readable media include instructions that are executable by a client device to output an electronic program guide having an option that is selectable to display representations of content that are available via one or more channels during primetime exclusively.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
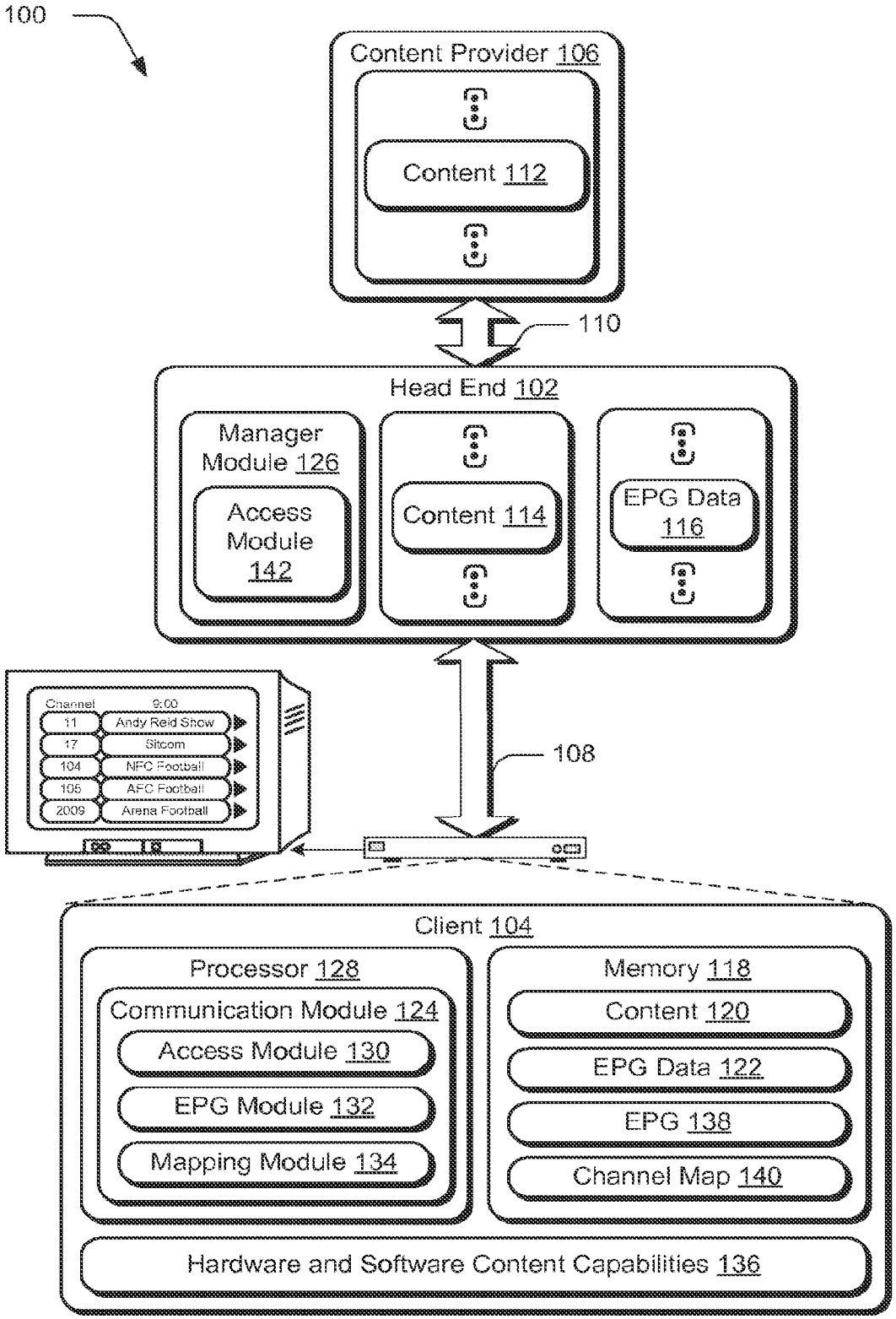
FIG. 1 is an illustration of an environment in an example implementation that is operable to employ techniques related to content access.

Clients having personal video recorder (PVR) functionality are increasing in popularity due to time shifting functionality. For example, a user may set the client to record favorite television programs using PVR functionality, such as through selection in an electronic program guide (EPG). However, complexity of traditional clients having PVR functionality may be intimidating for some users, especially for a first time user. For instance, users may be confronted with the challenge of learning how to use electronic program guide (EPG), find content that is popular and interesting to record, manage recordings that have already been scheduled, and so on.

Overcoming these challenges may be time-consuming and frustrating to the users. For example, a traditional approach employed by a client having PVR functionality was based on an implicit directive that users were to browse through the EPG to find interesting programs that the users wanted to record on their own. This may be overwhelming for some users and may become more acute as the amount of EPG data that may be delivered to the clients increases. Consequently, the users may be forced to browse through an ever increasing amount of data in an EPG of find particular content of interest. As a result, it may take months before the user has set the client to record each item of content that the user is interested in and thus take full advantage of the PVR functionality of the client.

Techniques are described to provide access to content. In an implementation, one such technique may make it easier for a user to address the challenges described above by leveraging EPG data associated with the content. For example, EPG data may be utilized to locate content that is to be broadcast during primetime to a client. Representations of this content may then be output in an electronic program guide such that a user may more readily locate particular content of interest. For example, a user may select a channel to look at content being aired during primetime on that channel in an EPG and from the EPG setup the recording of one or more items of content, further discussion of which may be found in relation to FIGS. 5 and 8.

In another implementation, access to the content may be managed based on capabilities of the client to output the content as well as what content is available to the client. For instance, in some instances a high-definition channel may have content that matches content provided via a standard-definition channel, such as when the television network provides content as separate streams via respective channels to broadcast the content in high definition and standard definition. However, inclusion of both channels in an EPG may be duplicative. Consequently, in this implementation access to channels having matching content is granted or restricted based on the capabilities of the client (e.g., capability to output content in high definition). In another instance, a determination may be made that a client has access to matching content from a variety of different sources, such as "over the air," satellite, cable, DSL, and so on. These different sources may be represented using a single representation in a user interface (e.g., an EPG) such that management of which underlying source is used may happen dynamically on a case by case basis. Further discussion of these techniques may be found in relation to FIGS. 3, 6 and 9.

In a further implementation, an electronic program guide includes a default mode to cause a client having PVR functionality to be configured to automatically record a television series when a television program is selected for recording. For example, a user may select a particular television program to be recorded that is to be broadcast during a particular time. Because the user may have an increased likelihood of desiring future broadcasts of the particular television program, the client may be automatically configured to record the television series that includes the television program. In this way, a user may quickly setup a client having PVR functionality to record content of interest without manually selecting each individual television program or navigating to another portion of the to specify the television series, further discussion of which may be found in relation to FIGS. 4 and 7.

In the following discussion, an example environment is first described that is operable to perform techniques that relate to content access. Example procedures are then described that may be employed in the example environment, as well as in other environments. Although these techniques are described as employed within a television environment and electronic program guide in the following discussion, it should be readily apparent that these techniques may be incorporated within a variety of other environments (e.g., other broadcast environments such as radio) using a variety of content without departing from the spirit and scope thereof.

Example Environment

FIG. 1 is an illustration of an environment 100 in an example implementation that is operable to employ techniques related to content access. The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes software and/or a device (e.g., a client device having a processor and memory as illustrated).

The content provider 106 includes one or more items of content 112. The content 112 may include a variety of data, such as television programming, video-on-demand (VOD) tiles, and so on. The content 112 is communicated over the network connection 110 to the head end 102. In the following discussion, content may also be referred to as "items of content," "a plurality of content," "particular content," and so on.

Content 112 communicated via the network connection 110 is received by the head end 102 and may be stored as one or more items of content 114. The content 114 may be the same as or different from the content 112 received from the content provider 106. The content 114, for instance, may include additional data for broadcast to the client 104.

One example of this additional data is illustrated in FIG. 1 as electronic program guide (EPG) data 116. The EPG data 116 may be configured to describe the content 114 being broadcast by the head end 102, such as a time of broadcast (e.g., "airing"), genre, format (e.g., high definition versus standard definition), actors, director, title, and so on. The EPG data 116 may be obtained from an EPG database for broadcast to the client 104. Distribution from the head end 102 to the client 104 may be accommodated in a number of ways, including cable, radio frequency (RF), microwave, digital subscriber line (DSL), satellite, via Internet Protocol (IP) connection, and so on. Although the EPG data 116 is illustrated as being provided by the head end 102 for the sake of simplicity of the figure, it should be readily apparent that the EPG data 116 may originate from a wide variety of sources, such as a standalone third-party provider (e.g., a website).

The client 104, as previously stated, may be configured in a variety of ways to receive the content 114 and the EPG data 116 over the network connection 108. The client 104 typically includes hardware and software to transport and decrypt content 114 and the EPG data 116 received from the head. end 102 for rendering by the illustrated display device. Although a display device is depicted in FIG. 1, a variety of other output devices are also contemplated, such as speakers.

The client 104 may also include personal video recorder (PVR) functionality. For instance, the client 104 may include memory 118 to record content 114 and EPG data 116 as content 120 and EPG data 122, respectively. The memory 118 may be configured in a variety of ways, such as a hard disk drive, a removable computer-readable medium (e.g., a writable digital video disc), semiconductor based memory, and so on. Thus, content 120 that is stored in the memory 118 of the client 104 may be copies of the content 114 that was streamed from the head end 102.

The client 104 includes a communication module 124 that is executable on the client 104 to control content output, such as through the use of one or more "command modes" to tune to a particular channel, order pay-per-view content, and so on. The command modes may also provide PVR functionality such as to provide non-linear playback of the content 120 (i.e., time shift the playback of the content 120) such as pause, rewind, fast forward, slow motion playback, and the like which is sometimes referred to as "trick modes".

The head end 102 is illustrated as including a manager module 126. The manager module 126 is representative of functionality to configure content 114 for output (e.g., streaming) over the network connection 108 to the client 104. The manager module 126, for instance, may configure content 112 received from the content provider 106 to be suitable for transmission over the network connection 108, such as to "packetize" the content 112 for distribution over the Internet, configuration for a particular broadcast channel, map the content 112 to particular channels for broadcast, and so on.

Thus, in the environment 100 of FIG. 1, the content provider 106 may broadcast the content 112 over a network connection 110 to a multiplicity of network operators, an example of which is illustrated as head end 102. The head end 102 may then stream the content 114 over a network connection t108 o a multitude of clients, an example of which is illustrated as client 104. The client 104 may then store the content 114 in the memory 118 as content 120 (such as when the client 104 is configured to include personal video recorder (PVR) functionality) and/or render the content 114 immediately for output as it is received.

The client 104 is illustrated as executing the communication module 124 on a processor 128, which is also storable in memory 118. Processors 128 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 118 is shown for the client 104, a wide variety of types and combinations of memory may be employed, such as random access memory (RAM), hard disk memory, removable medium memory, and other types of computer-readable media.

The communication module 124 is also illustrated as including an access module 130, an EPG module 132, and a mapping module 134. The access module 130 is representative of functionality to manage access to content, in an implementation, this access may be managed at the client 104 based on hardware and software content capabilities 136 of the client 104 to output content 114. For instance, the hardware and software content capabilities 136 may support high-definition output, e.g., video and/or audio. Accordingly, the access module 130 may grant access to the high-definition content and restrict access to standard-definition content when matching content is available to the client 104.

For example, the access module 130 may communicate with the EPG module 132 to form an EPG 138 that includes representations of content. Additionally, inclusion of representations in the EPG 138 may be based on the hardware and software content capabilities 136. When the client 104 includes hardware and software content capabilities 136 to display high definition content, for instance, the EPG 138 may be formed to include representations of content 114 that is provided via high-definition channels and not that matching content that is provided via one or more standard-definition channels.

In another example, the access module 130 may communicate with a mapping module 134 to form a channel map 140. The channel map 140 may be utilized by the communication module 124 to control which channels are available to a user, e.g., such as via "channel up" or "channel down" control functions, by typing in a numerical identifier of the channel, and so on. Accordingly, when the client 104 includes hardware and software content capabilities 136 to display high-definition content, the channel map 140 may be formed such that the high-definition channels and not the standard-definition channels that provide matching content are available. Thus in this instance the user is automatically provided access to high-definition channels, which may be provided even in an instance in which the user requests a standard-definition channel (e.g., by redirecting), further discussion of which may be found in relation to FIG. 6.

Although the functionality of the access module 130 has been discussed at the client 104, the functionality may be incorporated throughout the environment 100 of FIG. 1 and elsewhere such as at a standalone website. For example, the head end 102 may incorporate this functionality as represented by access module 142 to form the EPG 138 and/or channel map 140 for communication to the client 104 over the network connection 108.

Thus, as described above the access module 130 may leverage EPG data 116 that describes content 114 in a variety of ways to manage content access. For example, the access modules 130, 142 may form logical groupings around popular content, primetime content and other logical groupings of content to help a user setup a recording for favorite content. This may be performed by the access modules 130, 142 through filtering and/or consolidating the EPG data 122 to present options to a user to setup recordings. For example, the user may select a channel in the EPG 138 and look at representations of the television programs to be broadcast (i.e., "aired") during primetime on that channel. The user may then setup the recordings from the EPG 138 by selecting representations of those television programs. This example may be extended to a movie portal when the user wants to schedule recording of movies by presenting the user with information about upcoming movies.

In another example, the access module 142 may create a multi-dimensional list of popular content and deliver the list to the client 104 via the network connection 108. This list may then be presented to the user to schedule recordings. For instance, a user may be provided with a list (e.g., through the EPG 138) of the twenty most popular television programs being broadcast by the head end 102. The user could select the television programs from this list to cause the communication module 124 to record those television programs to memory 118 included as content 120) using PVR functionality. Other groupings are also contemplated, such as groupings of late night talk shows, daytime talk shows, children's programming, newly broadcast content, "by channel," and so on. In this way, a user interested in the represented content in the EPG 138 may be presented with a selection of content that falls in that group and quickly setup the recordings.

These techniques may support a variety of different user scenarios. In a first time user scenario, for instance, a user subscribes to the service provided by a network operator of the head end 102. A service technician from the network operator may setup the client 104 at a customer's location (e.g., the customer's house) to receive content 114 via the network connection 108 from the head end 102. When the client 104 is first switched on, EPG data 116 that specifies popular content may be downloaded to the client 104 via the network connection 108. The client 104 may then present an option to guide the user through a recordation process. Selection of the option may cause the client 104 to "walk the user" through this process to setup recordings.

In an experienced user scenario, the user may leverage these techniques to manage recordings from a central location in the EPG 138. For instance, the EPG 138 (when so configured) may provide an efficient tool for users to setup recordings of popular content, primetime content, and so on from these groupings. The previous techniques may also be configured to inform the user of scheduling conflicts, enable a user to set a recording for content that is no longer being broadcast in the hope of a broadcast being performed in the future, and so on.

It should be noted that one or more of the entities shown in FIG. 1 may be further divided (e.g., the head end 102 may be implemented by a plurality of servers in a distributed computing system), combined (e.g., the head end 102 may incorporate functionality of the content provider 106), and so on. Thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof In the case of a software implementation, for instance, the module, functionality, or logic represents program code that performs specified tasks when executed on a processor (e.g., CPU or CPUs). The program code can be stored in one or more computer-readable memory devices, such as the memory 118. The features of the content access techniques are platform-independent, meaning that the techniques may be implemented on a variety of commercial computing platforms having a variety of processors.

Figure 2:
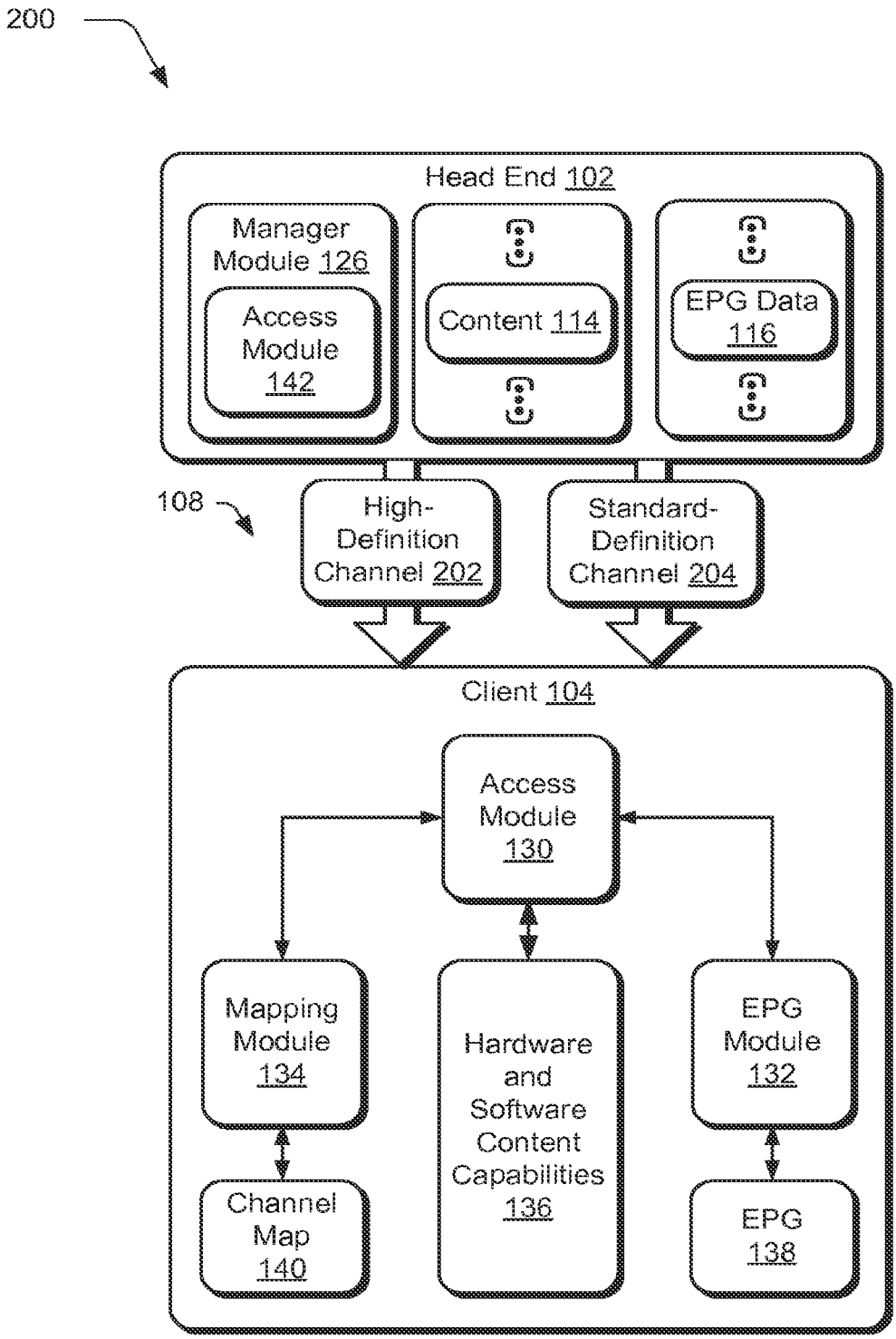
FIG. 2 depicts a system in an example implementation showing a client of FIG. 1 as receiving separate streams of matching content from the head end of FIG. 1.

FIG. 2 depicts a system 200 in an example implementation showing the client 104 as capable of receiving separate streams of matching content from the head end 102. The head end 102 is illustrated as being configured to stream content 114 to the client 104 over the network connection 108. The network connection 108 includes a high-definition channel 202 and a standard-definition channel 204 to stream the content 114 to the client 104.

In the illustrated system 200, the access module 130 of the client 104 is configured to determine the hardware and software content capabilities 136 of the client 104. This determination may be performed in a variety of ways, such as by querying a driver of the client 104 e.g., to determine which software and/or hardware is available on the client), to locate a preconfigured identifier that indicates the capabilities of the client 104, based on an input received from a user to interaction with the user interface output by the client 104 (e.g., to specify whether a television connected to a set-top box supports high definition and so on.

The access module 130 may then manage access to the content 114 based on the determination. For example, the access module 130 may review the EPG data 116 to determine which channels have matching content 114. The access module 130 may also determine that the hardware and software content capabilities 136 of the client 104 did not support a high-definition output. Accordingly, the access module 130 may communicate with the mapping module 134 to include the standard-definition channel 204 in the channel map 140 and not the high-definition channel 202. In this way, the access module 130 may restrict access to the high-definition channels 202 and permit access to the standard-definition channel 204.

In another example, the access module 130 may communicate with the EPG module 138 to form the EPG 13 such that representations of the standard-definition channels 204 included representations of the high-definition channels 202. Thus in this example the EPG 138 is not cluttered with representations of high-definition channels that could not be output by the client 104 based on the hardware and software content capabilities 136 of the client 104. In an implementation, a single representation may be output that, when selected, causes the access module 130 to dynamically select a stream on a case-by-case basis.

For example, the access module 130 may make a dynamic determination based on what streams are currently being used. For instance, a house may support two high-definition streams and two additional standard definition streams at any one time. If both high-definition streams are "in use" in other parts of the house, the access module 130 may perform the following actions. First, when a request is received for a channel having content that is available in high definition (HD) and standard definition (SD) versions, the access module may determine that both available HD streams are in use. The access module 130 may then determine that an SD version is available and tune to the SD version. The access module may also inform a user that the SD stream is being viewed since HD stream is not available. In an implementation, when the HD stream becomes available, the access module 130 may automatically tune to that stream.

The access module 130 may also perform similar techniques when scheduling future recordings. If each available HD stream is reserved for other scheduled recordings, the access module 130 may "fall back" to using the SD stream instead. Additionally, the access module 130 may output a user interface to explain the current circumstances of the recording and offer options to the user, such as to switch resolutions of the scheduled recordings. A variety of other examples are also contemplated, further discussion of which may be found in relation to the following figure.

Figure 3:
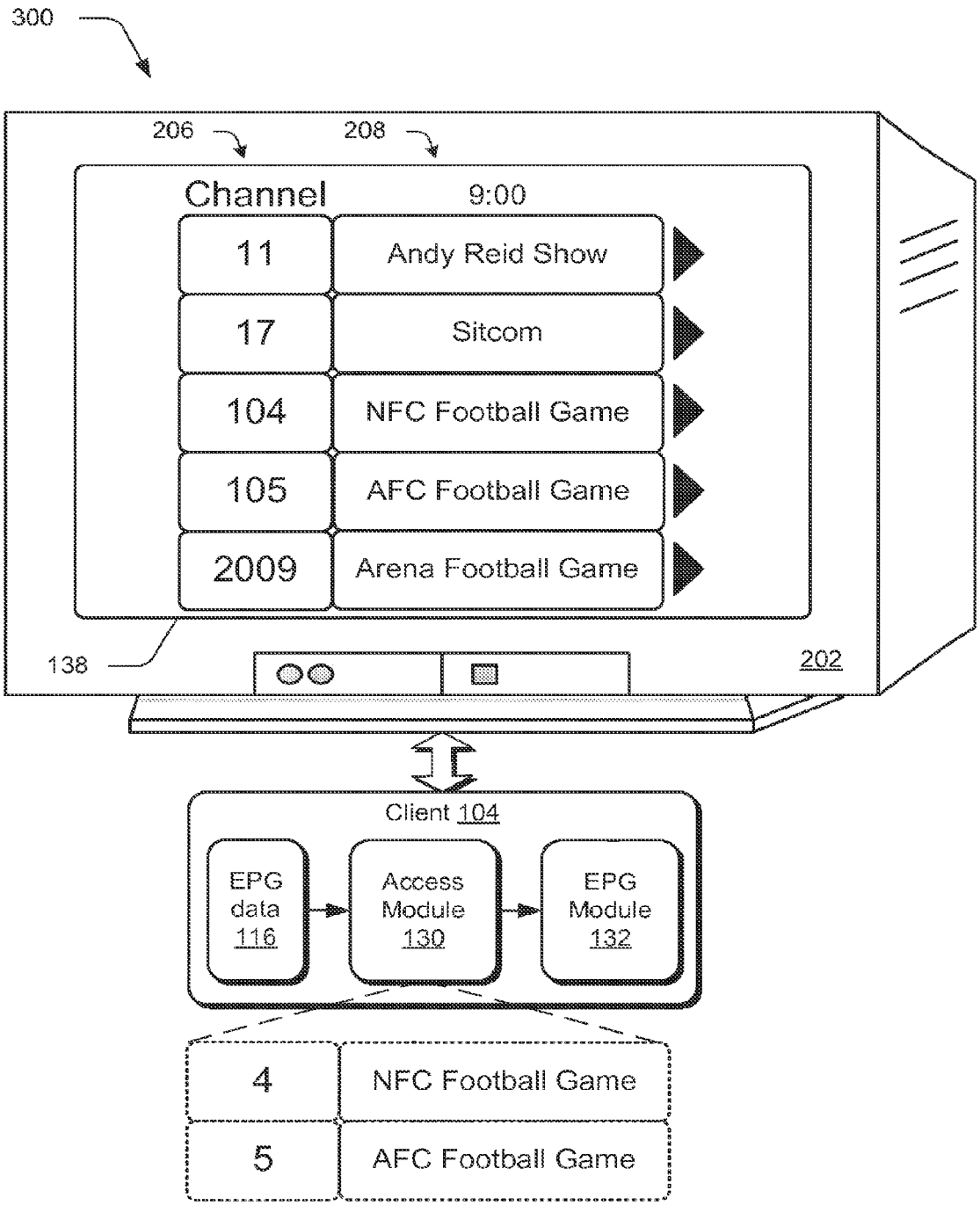
FIG. 3 depicts a system in an example implementation in which an EPG of FIG. 1 is output by the client to control access to content based on capabilities of the client.

FIG. 3 depicts a system 300 in an example implementation in which the EPG 138 is output by the client 104 to control access to content based on capabilities of the client 104. The access module 130 is illustrated as processing EPG data 116 that was received from the head end 102 in FIG. 1. During this processing, the access module 130 may determine which channels provide matching content, e.g., the same television programs. The access module 130 may then communicate a listing to the EPG module 132 of television channels to be used to form the EPG 138 which is illustrated as being output on a display device 202 communicatively coupled to the client 104.

The illustrated EPG 138 is shown as having a first column of representations 206 of channels and a second column of representations 208 of content that is available via the respective channels at a particular point in time. In this example, the access module 130 may determine that channel 4 and channel 104 include matching content, which in this instance is an NFC football game. Likewise, the access module 130 may also determine that channels 5 and 105 include matching content, which in this instance is an AFC football game. Thus, even though the content is to be displayed in different resolutions the content itself that is to be displayed matches e.g., is the same item of content such as a television program, a radio show, and so on.

In this instance, the access module 130 may determine that the hardware and software content capabilities 136 of the client 104 support high definition output. Accordingly, access module 130 may communicate this information to the EPG module 132 such that representations of the high-definition channels (e.g., channels 104 and 105) and the respective content available via those channels is output in the EPG 138, thereby giving access to those channels. The access module 130 may also exclude standard-definition channels (e.g., channels 4 and 5) and representations of the respective content available via those channels from being output in the EPG 138, which is illustrated in FIG. 3 through the use of phantom tines.

In an implementation, the representations may be configured to provide a consistent user experience. For example, Channels 4 and 5 may have existed for decades and are therefore familiar to the user. However, channels 104 and 105 may be recent creations to provide HD content. Therefore, the EPG may be configured to output representations of channels 4 and 5, but redirect requests for the represented content of those channels to the respective HI) channels. Thus, in this example channels 4 & 5 (and not channels 104 and 105) appear in the EPG. "Behind" those channel the access module 130 may route requests for that content as described above, as well as to other sources, such as an OTA (over the Air) source, video-on-demand (VOD) source, and so on. A variety of other techniques may also be used to permit and restrict access to channels based on the capabilities of the client 104, further discussion of which may be found in relation to FIG. 6.

Figure 4:
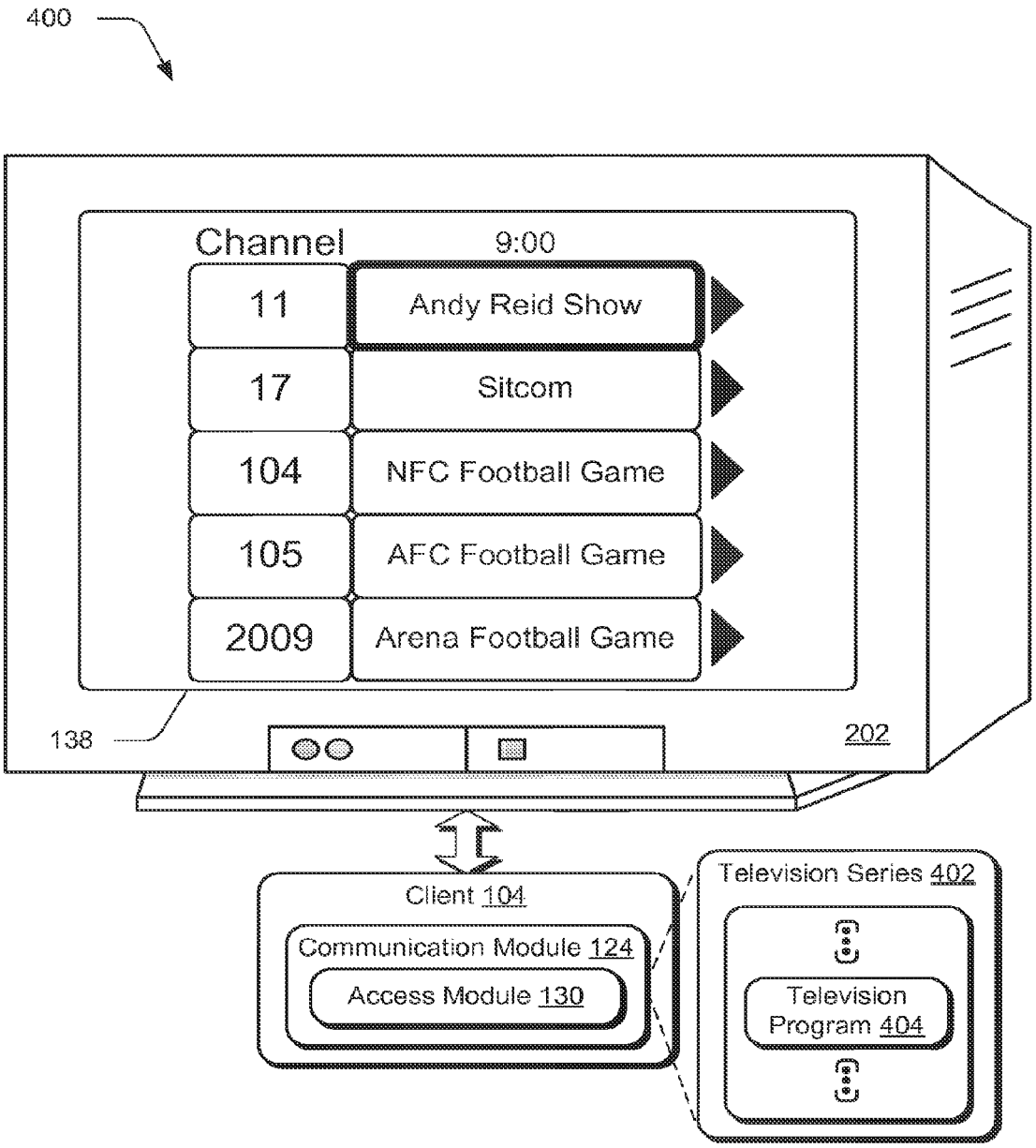
FIG. 4 depicts a system in an example implementation in which an access module of FIG. 1 provides functionality to automatically record a television series when a television program in the television series is selected for recording.

FIG. 4 depicts a system 400 in an example implementation in which the access module 130 provides functionality to automatically record the television series 402 when a television program 404 in the television series 402 is selected for recording. In the illustrated example, a television program "Andy Reid Show" is selected in the EPG 138 for recording. This selection may be performed in a variety of ways, such as through use of a cursor control device.

In response to the selection, the access module 130 may determine whether the selected television program 404 is included in a television series 402. For example, the access module 130 may utilize the EPG data 116 to make this determination. When the television program 404 is included in a television series 402, the access module 130 may configure PVR functionality of the client 104 to record the television series 402. In an implementation, this functionality to automatically record the television series 402 is implemented as a default mode. In this way, future episodes in the television series 402 of a television program 404 may be automatically recorded and thus aide a user in setup of the client 104 as previously described. Further discussion of recordation of a television series 402 may be found in relation to FIG. 7.

Figure 5:
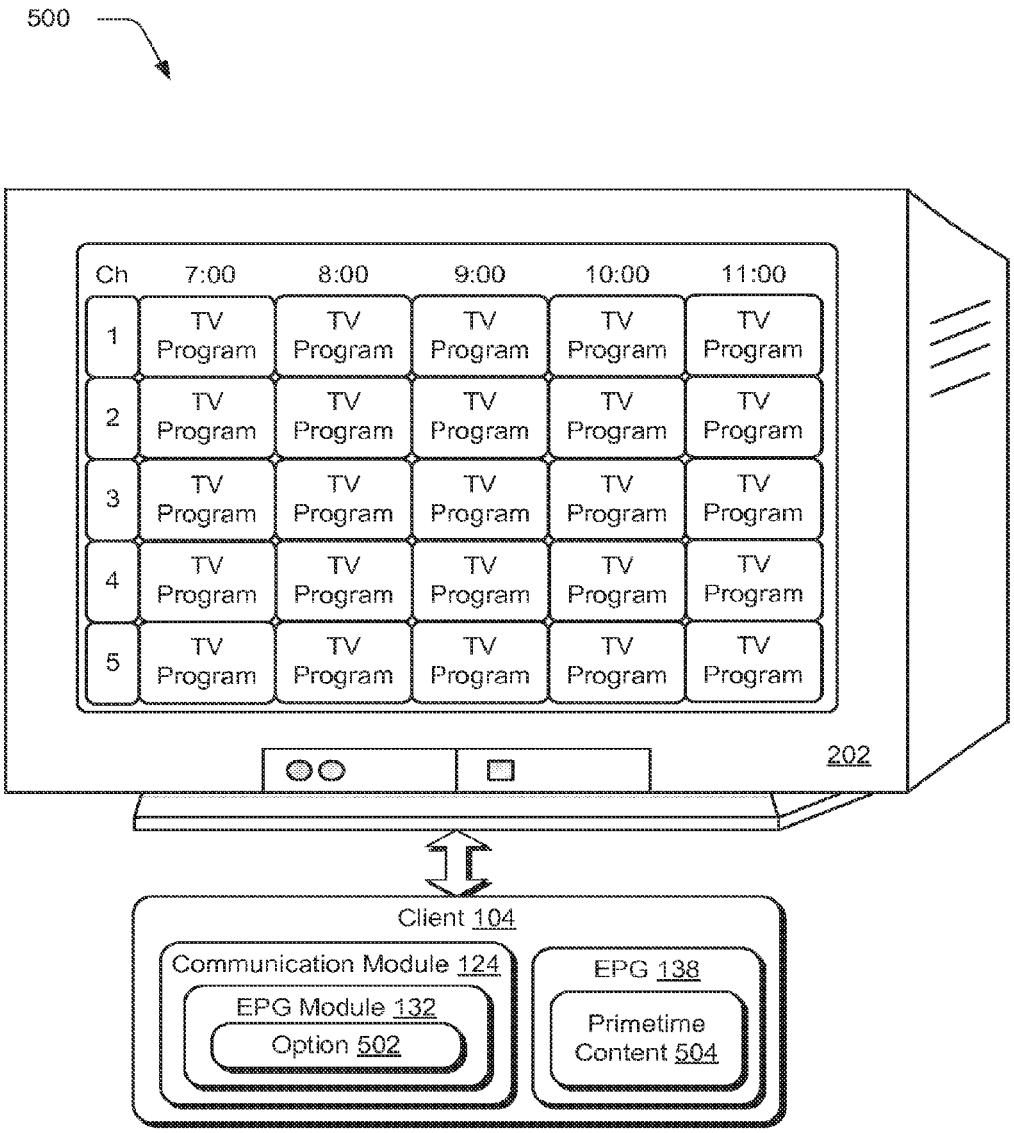
FIG. 5 depicts a system in an example implementation in which the access module of FIG. 1 configures the EPG to display content that is to be broadcast during primetime exclusively.

FIG. 5 depicts a system 500 in an example implementation in which the access module 130 configures the EPG 138 to display content that is to be broadcast during primetime exclusively. In the illustrated system 200, the EPG module 132 is configured to provide an option 502 to form an EPG 138. The EPG 138 is configured in accordance with the option 502 to output representations of primetime content 504 exclusively in the EPG 138.

As illustrated in a display of the EPG 138 on the display device 202 of FIG. 5, representations of content are illustrated for channels one through five between the times of 7 and 11 p.m. Although in this implementation representations for the entirety of primetime are displayed together for channels one through five, it should be readily apparent that other implementations are also contemplated, e.g., navigating to representations displayed "off screen." Further discussion of configuring an EPG to display representations of primetime content may be found in relation to FIG. 8.

Example Procedure

The following discussion describes content access techniques that may be implemented utilizing the previously described environment, systems and devices. Aspects of each of the procedures may be implemented in hardware, firmware, or software, or a combination thereof The procedures are shown as a set of blocks that specify operations performed by one or more devices and are not necessarily limited to the orders shown for performing the operations by the respective blocks. In portions of the following discussion, reference will be made to the environment 100 of FIG. 1 and systems 200-500 of FIGS. 2-5, respectively.

Figure 6:
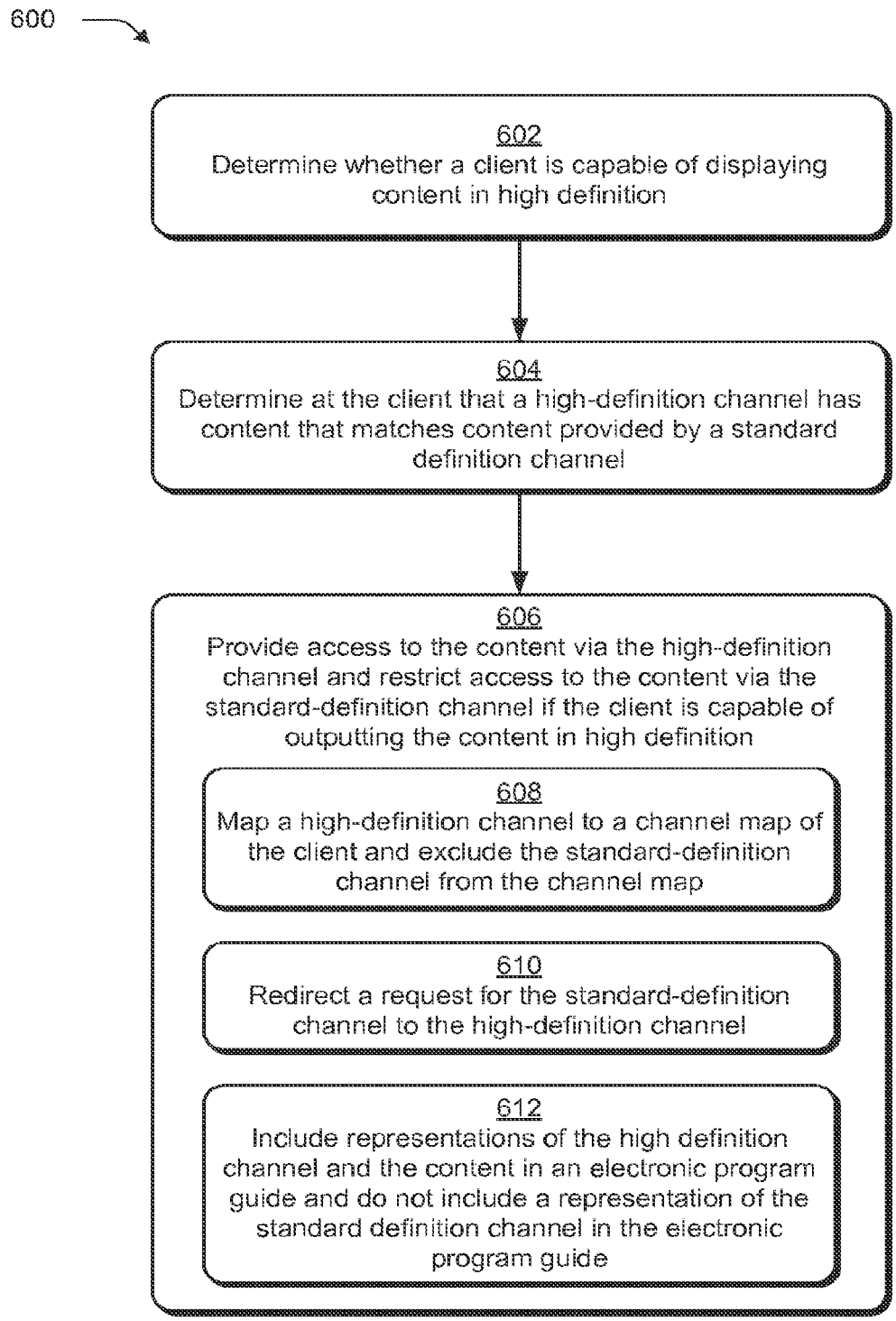
FIG. 6 is a flow diagram depicting a procedure in an example implementation in which access is managed based on capabilities of a client that is to output the content

FIG. 6 depicts a procedure 600 in an example implementation in which access is manage based on capabilities of a client that is output the content. A determination is made as to whether a client is capable of displaying content in high definition (block 602). For example, the access module 130 of the communication module 124 may query the hardware and software content capabilities 136 of the client 104. This query may be performed in a variety of ways, such as via a investigating drivers stored in memory 118 of the client 104, an identifier input by a user of the client 104 (e.g., to identify a specific display device communicatively coupled to the client 104), and so on.

A determination is made at the client 104 that a high-definition channel 202 has content that matches content provided by standard-definition channel 204 (block 604). For instance, the access module 130 may examine EPG data 116 to determine that the high-definition channel 202 streams content that matches the content streamed on the standard-definition channel 204. In another example, the determination may be based on an identification of the content provider 106 (e.g., call letters). A variety of other examples are also contemplated without departing from the spirit and scope thereof.

Access to the content is provided via the high-definition channel and access to the content via the standard-definition channel is restricted if the client is capable of outputting the content in high-definition (block 606). As previously described, this access may be managed in a variety of ways. For instance, the high-definition channel may be mapped to channel map of the client and the standard-definition channel may be excluded from the channel map (block 608).

In another instance, a request for the standard-definition channel may be redirected to the high-definition channel (block 610). For example, the client 104 of FIG. 3 may support output of high-definition content. Accordingly, the client 104 may redirect the request for channel 4 (e.g., the standard definition content available via a standard-definition channel) to channel 104, which matches the content of channel 4 but is provided in high definition. As previously described, the redirection may be performed "behind the scenes" such that a user is unaware of the redirection.

Representations of the high-definition channel and the content are included in an electronic program guide that does not include a representation of the standard-definition channels in the electronic program guide (block 612). Returning again to FIG. 3, the representations of the high-definition channel (e.g., channel 104) and the content available via that channel (e.g., NFC football game) are displayed in the EPG 138. However, the representation of the standard-definition channel (e.g., channel 4) is not displayed in the EPG 138. Thus, clutter which may be caused by repeating representations of content (e.g., the NFC football game twice) and/or the representation of the standard-definition channel is removed from the EPG 138 in this example.

Figure 7:
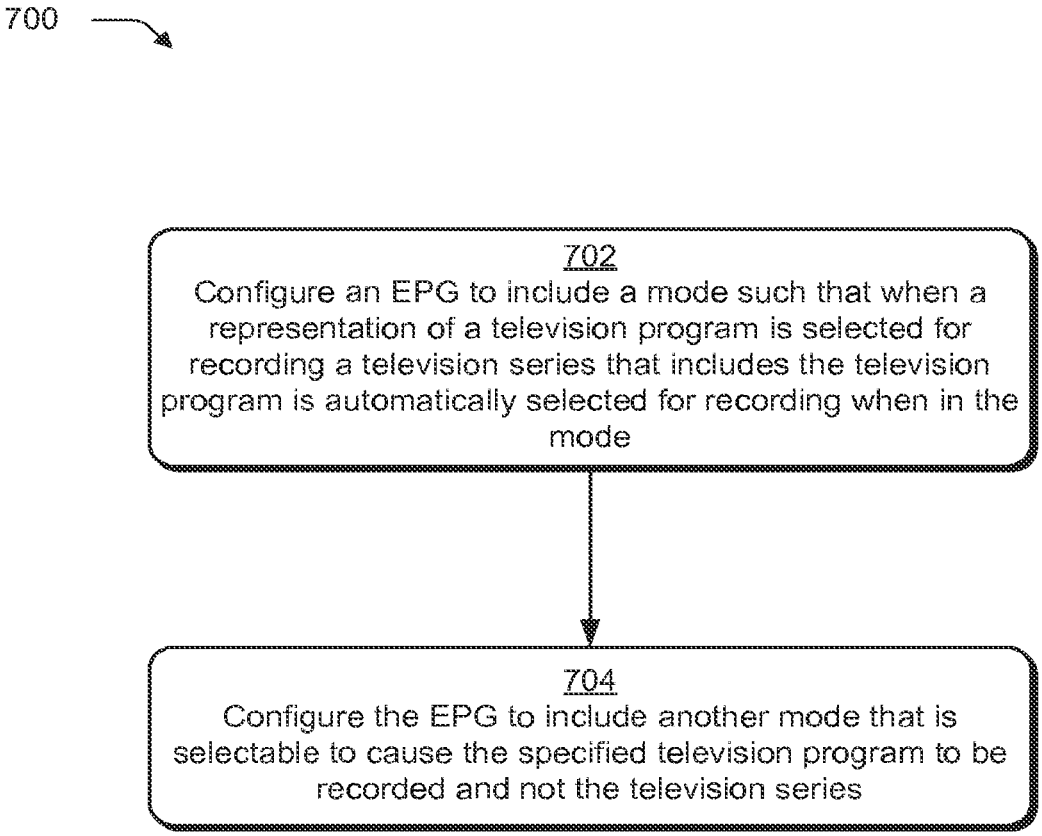
FIG. 7 is a flow diagram depicting a procedure in an example implementation in which an EPG is configured to include a mode to cause automatic television series recording.

FIG. 7 depicts a procedure 700 in an example implementation in which an EPG is configured to include a mode to cause automatic television series recording. An EPG is configured to include a mode such that when a representation of a television program is selected for recording, a television series that includes a television programs automatically selected for recording when in that mode (block 702). For example, the EPG 138 of FIG. 4 may be configured such that the mode is a default mode. When in the default mode, if the user selects a particular television program (e.g., the Andy Reid show), the access module 130 may be configured to include a television series 402 that includes the television program 404. In this way, future episodes of the television program 404 may be automatically recorded by the client 104 using PVR functionality of the client coming e.g., such as to record the content 120 to memory 118 of the client 104.

The automatic recordation may be performed directly by the access module 120 without further input from a user and/or indirectly by querying the user. For example, the access module 130 may output a confirmation screen such that a user may confirm that the television series is to be recorded. In another example, the access module 130 may provide an option to rank recordation of the television series 404 in relation to other television series that were previously scheduled for recording to resolve conflicts between the television series and more particularly episodes of television programs included in the television series.

The EPG may also be configured to include another mode is selectable to cause the specified television program to be recorded and not the television series (block 704). For example, the EPG 138 may be configured to include another mode to switch out of the previously described a default mode such that a television series is not automatically recorded. In this way, a user may set up the client 104 when initially received for recording of the television series. After a while, however, the user may have the client 104 configured as desired for recordation of content and therefore switch out of this default mode to record particular television programs of interest and not each future episode of the television series, e.g., such as to conserve space in the memory 118 of the client 104. A variety of other examples are also contemplated, such as through provision of the mode to record the television series but not in a default mode as previously described.

Figure 8:
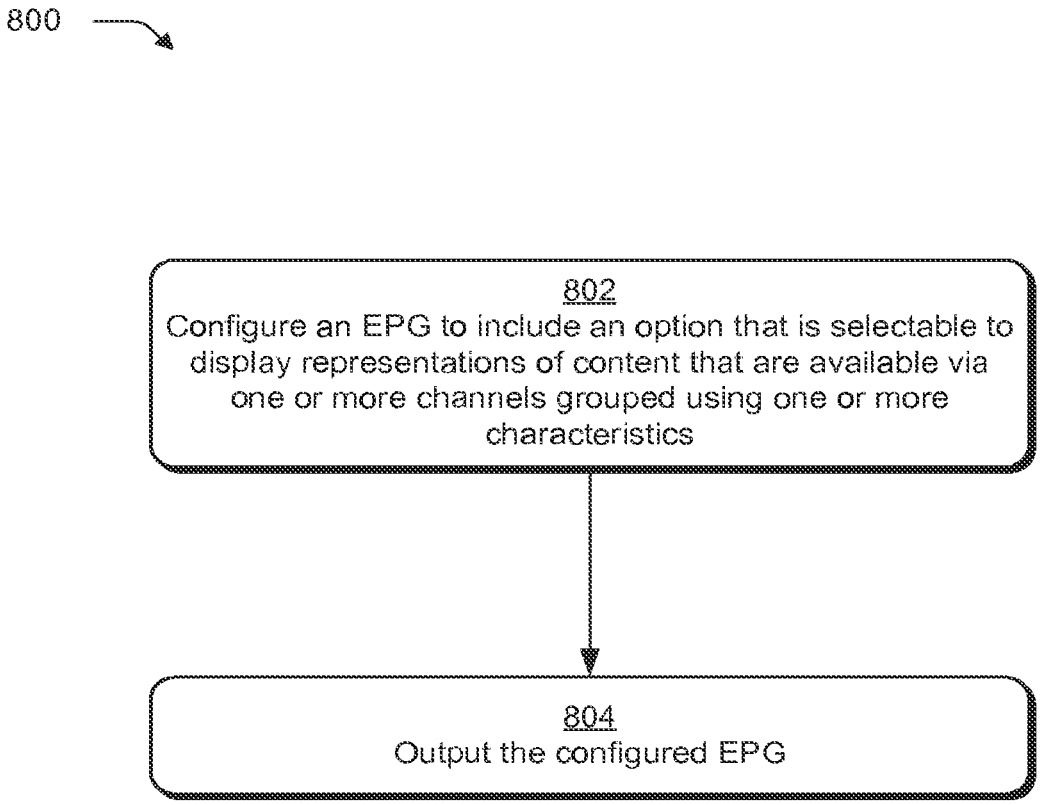
FIG. 8 is a flow diagram depicting a procedure in an example implementation in which an electronic program guide includes representations of content broadcast during primetime exclusively.

FIG. 8 depicts a procedure 800 in an example implementation in which an electronic program guide includes representations of content broadcast during primetime exclusively. An EPG is configured to include an option that is selectable to display representations of content that are available via one or more channels grouped using one or more characteristics (block 802). For example, the option may be selectable to cause the EPG to output representations of content that is available via primetime exclusively. Primetime may he defined in a variety of ways and may differ based on geographic location, e.g., primetime in the central time zone may defined as between 7-10 whereas primetime in the Pacific time zone may be defined as occurring between 8-11. The configured EPG is then output (block 804).

For example, the option may be made available in the EPG 138, e.g., via selection in a drop-down menu, a display of a button, a key combination, and so on. The option, when selected, may cause the EPG 138 to exclude representations of content that is not available via a broadcast during primetime at the client 104, e.g., as indicated by the EPG data 116. For instance, the access module 130 in conjunction with the EPG module 132 may configure the EPG 138 to output representations of content that is to be broadcast between the hours of 7 and 11 p.m. to the client 104. In this way, a user may readily navigate the representations of content that are more likely to be of interest to the user as targeted by a network operator (e.g., an operator of the head end 102) and/or the content provider 106. As previously described, a variety of other logical groupings are also contemplated. For example, options may be output to filter the EPG data 116 to display representations of content such as daytime soap operas, late-night talk shows, and so on as previously described in relation to FIG. 1.

Figure 9:
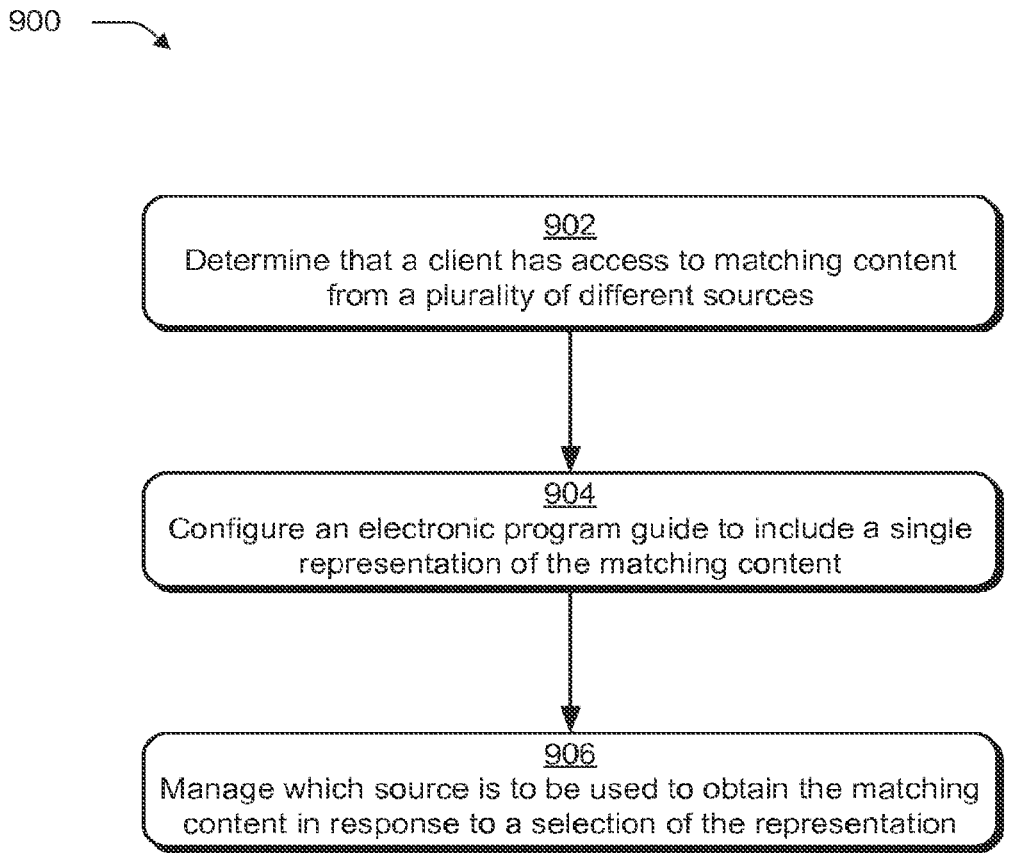
FIG. 9 is a flow diagram depicting a procedure in an example implementation in which a single representation is leverage to manage matching content available from a plurality of sources.

FIG. 9 depicts a procedure 900 in an example implementation in which a user interface is configured to include a single representation of matching content that is available via a plurality of sources. A determination is made that a client has access to matching content from a plurality of different sources (block 902). For example, as previously described the client 104 may have access to a high-definition channel 202 and a standard0definition channel 204 from a head end 102. The client 104 may also have access to the matching content from different providers, such as an "over the air" broadcast, cable, satellite, video-on-demand (VOD).

An electronic program guide is configured to include a single representation of the matching content (block 904) such that management may be performed as to which of the plurality of sources is used to obtain the matching content in response to a selection of the representation. Thus, this management may be performed dynamically in response to the selection.

For example, a user may select a representation of a particular sporting event that is available from a variety of sources, such as an over-the-air broadcast, via VOD, and via different channels from a head end 102 (e.g., standard and high definition), and so on. The access module 130 may then manage which stream will be sued to provide the content represented in the EPG, such as whether a stream is available (e.g., the household example above), based on cost, capabilities of the client 104, and so on. Further, this management may be performed dynamically in response to the request to address changing considerations, e.g., whether an HD stream has become available in a household. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

~~[1. A method comprising:~~

~~receiving a user selection of media content, wherein the media content is available in a first format from a first media source;~~

~~accessing the media content in the first format from the first media source;~~

~~determining that the media content is available in a second format from a second media source, wherein the second media source is different than the first media source;~~

~~determining whether a client device is capable of generating for display the media content in the second format; and~~

~~responsive to the second media source becoming available, automatically accessing the media content from the second media source instead of the first media source if the client device is capable of generating for display the media content in the second format.]~~

~~[2. The method of claim 1, wherein determining whether the client device is capable of generating for display the media content in the second format comprises determining hardware and/or software capabilities of the client device.]~~

~~[3. The method of claim 2, wherein determining the hardware and/or software capabilities of the client device comprises querying a driver.]~~

~~[4. The method of claim 2, wherein determining the hardware and/or software capabilities of the client device comprises locating a preconfigured identifier that indicates the capabilities of the client device.]~~

~~[5. The method of claim 1, wherein the first media source and the second media source comprise different channels from a head end.]~~

~~[6. The method of claim 1, wherein accessing the selected media content in the first format comprises accessing the selected media in standard definition.]~~

~~[7. The method of claim 1, wherein automatically accessing the media content from the second media source comprises accessing the media content in high definition.]~~

~~[8. The method of claim 1, wherein determining that the media content is available in the second format from the second media source comprises one of: determining whether the second media source is scheduled to provide the media asset, determining whether the second media source is capable of providing the media asset, determining whether a high definition stream of the client device is in use, and determining whether a standard definition stream of the client device is in use.]~~

~~[9. The method of claim 1, further comprising generating for display a representation of content that is available via a plurality of different sources at the same time.]~~

~~[10. The method of claim 1, wherein the first media source and the second media source comprise at least one of the following: a broadcast source, a cable source, a satellite source, and a video on demand (VOD) source.]~~

~~[11. A system comprising:~~

~~a processor configured to:~~

~~receive a user selection of media content, wherein the media content is available in a first format from a first media source;~~

~~access the media content in the first format from the first media source;~~

~~determine that the media content is available in a second format from a second media source, wherein the second media source is different than the first media source;~~

~~determine whether a client device is capable of generating for display the media content in the second format; and~~

~~responsive to the second media source becoming available, automatically access the media content from the second media source instead of the first media source if the client device is capable of generating for display the media content in the second format.]~~

~~[12. The system of claim 11, wherein the processor is configured to determine whether the client device is capable of generating for display the media content in the second format by determining hardware and/or software capabilities of the client device.]~~

~~[13. The system of claim 12, wherein the processor is configured to determine the hardware and/or software capabilities of the client device by querying a driver.]~~

~~[14. The system of claim 12, wherein the processor is configured to determine the hardware and/or software capabilities of the client device by locating a preconfigured identifier that indicates the capabilities of the client device.]~~

~~[15. The system of claim 11, wherein the first media source and the second media source comprise different channels from a head end.]~~

~~[16. The system of claim 11, wherein the processor is configured to access the selected media content in the first format by accessing the selected media in standard definition.]~~

~~[17. The system of claim 11, wherein the processor is configured to automatically access the media content from the second media source by accessing the media content in high definition.]~~

~~[18. The system of claim 11, wherein the processor is configured to determine that the media content is available in the second format from the second media source by performing one of: determining whether the second media source is scheduled to provide the media asset, determining whether the second media source is capable of providing the media asset, determining whether a high definition stream of the client device is in use, and determining whether a standard definition stream of the client device is in use.]~~

~~[19. The system of claim 11, wherein the processor is further configured to generate for display a representation of content that is available via a plurality of different sources at the same time.]~~

~~[20. The system of claim 11, wherein the first media source and the second media source comprise at least one of the following: a broadcast source, a cable source, a satellite source, and a video on demand (VOD) source.]~~

*21. A method for managing access to content based on capabilities of a client device, the method comprising:*

*determining whether a client device is capable of outputting content in high definition;*

*determining whether high-definition content is available via a high-definition channel and standard-definition*

*content corresponding to the high-definition content is available via a standard-definition channel;*

*in response to determining that the client device is capable of outputting content in high definition, the high-definition content is available via the high-definition channel, and the standard-definition content corresponding to the high-definition content is available via the standard-definition channel:*

*generating, for storage in a memory of the client device, a channel map that includes the high-definition channel and excludes the standard-definition channel; and*

*providing access to the high-definition content and restricting access to the standard definition content according to the channel map.*

*22. The method of claim 21, wherein the determining whether the high definition content is available via the high-definition channel and the standard-definition content corresponding to the high-definition content is available via the standard-definition channel comprises determining, based on electronic program guide data, whether the standard-definition content corresponds to the high-definition content.*

*23. The method of claim 21, wherein the determining whether the client device is capable of outputting content in high definition comprises querying the client device for hardware or software capabilities.*

*24. The method of claim 23, wherein the querying comprises querying a driver stored in the memory of the client device.*

*25. The method of claim 21, wherein the determining whether the client device is capable of outputting content in high definition comprises locating a preconfigured identifier that indicates a capability of the client device.*

*26. The method of claim 21, further comprising:*

*identifying a display device communicatively coupled to the client device; and*

*determining whether the display device is capable of displaying content in high definition.*

*27. The method of claim 21, further comprising excluding a representation of the standard-definition channel from an electronic program guide.*

*28. The method of claim 21, further comprising, according to the channel map:*

*providing access to the high-definition channel via a channel up function or channel down function of the client device and restricting access to the standard-definition channel via the channel up or channel down function of the client device.*

* * * * *